(12) United States Patent
Yamawaki

(10) Patent No.: US 6,506,970 B2
(45) Date of Patent: Jan. 14, 2003

(54) POWER-GENERATING ROOF TILE WITH PHOTOVOLTAIC MODULE

(75) Inventor: Takeharu Yamawaki, Moriyama (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/006,475

(22) Filed: Dec. 5, 2001

(65) Prior Publication Data

US 2002/0043277 A1 Apr. 18, 2002

Related U.S. Application Data

(63) Continuation of application No. PCT/JP00/03772, filed on Jun. 9, 2000.

(30) Foreign Application Priority Data

Jun. 9, 1999 (JP) .............................. 11-162354

(51) Int. Cl.[7] .......................... H01L 31/04; E04D 1/30; E04D 3/40
(52) U.S. Cl. ...................... 136/251; 136/244; 136/291; 52/173.3
(58) Field of Search ................................ 136/244, 251, 136/291; 52/173.3

(56) References Cited

U.S. PATENT DOCUMENTS 6,294,724 B1 * 9/2001 Sasaoka et al. .............. 136/251

2001/0034982 A1 * 11/2001 Nagao et al. .............. 52/173.3

FOREIGN PATENT DOCUMENTS

| EP | 1071137 A2 | * | 1/2001 |
| EP | 1071138 A2 | * | 1/2001 |
| EP | 1071139 A2 | * | 1/2001 |
| JP | 1-148417 U | | 10/1989 |
| JP | 10-018514 A | | 1/1998 |
| JP | 10-018515 A | | 1/1998 |
| JP | 10-37405 A | * | 2/1998 |
| JP | 10-037405 A | | 2/1998 |
| JP | 10-072910 A | | 3/1998 |
| JP | 10-088741 A | | 4/1998 |
| JP | 10-093127 A | | 4/1998 |
| JP | 11-6255 A | * | 1/1999 |
| JP | 11-006255 A | | 1/1999 |
| JP | 11-50622 A | * | 2/1999 |
| JP | 11-159063 A | | 6/1999 |
| WO | WO 96/24013 A1 | * | 8/1996 |

* cited by examiner

*Primary Examiner*—Alan Diamond
(74) *Attorney, Agent, or Firm*—Hogan & Hartson, LLP

(57) ABSTRACT

The invention includes a tile main body, a recess formed in the tile main body for receiving a photovoltaic module having its reverse surface provided with a terminal box, and a terminal-box-receiving recess provided at the bottom of the recess for receiving the terminal box. A cable lead-out section is provided at a portion toward a ridge of a roof. Output lead-out cables connected to the terminal box are led from the lead-out section toward the ridge.

20 Claims, 7 Drawing Sheets

POWER-GENERATING ROOF TILE WITH PHOTOVOLTAIC MODULE

CROSS REFERENCE TO RELATED APPLICATIONS

This is a Continuation Application of PCT Application No. PCT/JP00/03772, filed Jun. 9, 2000, which was not published under PCT Article 21(2) in English.

This application is based upon and claims the benefit of priority from the prior Japanese Patent Application No. 11-162354, filed Jun. 9, 1999, the entire contents of which are incorporated herein by reference.

BACKGROUND OF THE INVENTION

1. Field of the Invention

The present invention relates to a power-generating roof tile used as a roof member for a building and equipped with a photovoltaic module capable of solar-light power generation.

2. Description of the Related Art

A photovoltaic module capable of converting solar-light energy into electric energy is known. The use of a photovoltaic module by mounting it on a roof member of a building is also known from, for example, Jpn. UM Appln. KOKAI Publication No. 1-148417 and Jpn. Pat. Appln. KOKAI Publication No. 10-72910. Cables led from power-generating roof tiles equipped with a photovoltaic module are connected to each other, thereby electrically connecting a large number of photovoltaic modules in series or in parallel.

Jpn. UM Appln. KOKAI Publication No. 1-148417 describes a configuration in which a photovoltaic module is provided on the lower surface of a flat roof tile, and the cable of the photovoltaic module is led through a space made in reverse surfaces of the both ends of the upper edge of the flat tile. Although this publication describes the leading of the cable of a photovoltaic module from the reverse surface of a roof tile main body, no reference is made to a construction involving leading a cable to the ridge side of a roof.

Jpn. Pat. Appln. KOKAI Publication No. 10-72910 describes a configuration in which a photovoltaic module is provided on the top surface of a flat roof tile, and a terminal box is provided on the reverse surface of the flat roof tile, thereby leading a wiring member (cable) from the terminal box. Although this publication describes the leading of a cable from a terminal box to the reverse surface of a roof tile main body, no reference is made to a construction involving leading a cable to the ridge side of a roof.

Another roof tile equipped with a photovoltaic module, as stated below, is proposed. A photovoltaic module is provided on the top surface of a roof tile main body, and a terminal-box-receiving recess is provided in the roof tile main body, projecting from the reverse surface thereof. A terminal box attached to the reverse surface of the photovoltaic module is contained in the terminal-box-receiving recess. An output lead-out cable connected to the terminal box is led through a cable-leading hole formed in the bottom wall of the terminal-box-receiving recess.

The power-generating roof tile is rainproofed as follows. The photovoltaic module is adhered to the roof tile main body by an adhesive. The photovoltaic module is adhered, by an adhesive, to the bottom of the recess provided in the roof tile main body. Further, the clearance between the photovoltaic module and the inner peripheral surface of the recess is filled with a caulking member.

However, adhesives or caulking members can be easily degraded. In particular, if they are mounted on, for example, a roof where they are exposed to the solar-light, they can quickly degrade due to excessive heat, or from water-related corrosion. If the adhesive or caulking member cracks, rainwater may enter between the roof tile main body and the photovoltaic module.

It is possible that rainwater entering through the reverse side of the photovoltaic module will flow into the terminal-box-receiving recess. Power-generating roof tiles are usually arranged on the inclined sarking of a roof. Since the roof is thus inclined, rainwater entering and collecting in the bottom of the terminal-box-receiving recess leaks out over the upper surface of the recess. The rainwater may also run out through a cable-guiding hole formed at the bottom of the terminal-box-receiving recess. Accordingly, in particular, if the slope of the roof is not steep, it is very possible that the connection between a terminal box and the cable in the terminal-box-receiving recess will be exposed to rainwater entering it, leading to corrosion or a short-circuit thereof.

In addition, the sarking is provided very close to the terminal-box-receiving recess. In a configuration in which a cable is guided through the bottom wall of the terminal-box-receiving recess, the cable led in the direction of the sarking is arranged along the sarking. Therefore, the cable is sharply bent at substantially right angles to the direction in which the cable is led from a cable lead-out hole. Since the cable is thus bent, it is strongly pressed against the edge of the lead-out hole. Therefore, it is very possible that the insulating coating of the cable will be damaged. In particular, where the roof tile main body is formed of cement, the edge of a cable lead-out hole is burred, and hence its insulating coating is more easily damaged.

It is an object of the present invention to provide a power-generating roof tile capable of preventing, for example, electrical short-circuiting due to the entrance of rainwater, and reducing the possibility of the output lead-out cables being damaged.

BRIEF SUMMARY OF THE INVENTION

A power-generating roof tile according to the invention includes a photovoltaic module having a reverse surface thereof provided with a terminal box, and a tile main body including a recess that receives the photovoltaic module, and a terminal-box recess that is provided at a bottom of the recess and receives the terminal box. The tile main body further includes a cable lead-out section located at a ridge-side portion thereof where the tile main body is mounted on an inclined roof. Positive-side and negative-side output lead-out cables connected to the terminal box, which are single-core cables independent of each other, are led from the cable lead-out section to the ridge side.

In the invention, the tile main body is made of an inorganic material such as clay, a synthetic resin material or cement, a metal material, or a composite material thereof Electric wires coated with an insulator are used as the output lead-out cables. The photovoltaic module is formed by, for example, sequentially forming, on a substrate made of a transparent insulating material such as transparent glass or a transparent synthetic resin, a transparent electrode layer, a semiconductor layer capable of photoelectric conversion, and a reverse-side electrode layer in this order, using a thin-film manufacture technique, and then coating the reverse surface with a sealing material layer. The sealing material layer is used to insulate, waterproof or mechanically protect a to-be-sealed layer. An amorphous semiconductor layer is suitable for the semiconductor layer. However, the semiconductor layer is not limited to this but may be a monocrystal, polycrystal or microcrystal semiconductor layer. Alternatively, a silicon-based material or a compound material may be used. Further, a tandem-type photovoltaic module may be used.

In the invention, the two single-core output lead-out cables are independent of each other so as not to be used as a double-core cable. These single-core output lead-out cables are led to the ridge side from the cable lead-out section provided at a ridge-side portion of the tile main body. By virtue of this structure, even if, for example, rainwater enters the terminal-box-receiving recess that receives the terminal box, there is only a slim possibility of the rainwater reaching a connection of the terminal box and the cables. Accordingly, corrosion or electrical short-circuiting at the connection can be avoided. Moreover, since the two cables are led to the ridge side, it is not necessary to sharply bend the lead cables along the sarking about the cable lead-out section. This prevents the output lead-out cables from being damaged by the edge of the cable lead-out section. As a result, the invention can provide a high quality power-generating roof tile.

The invention includes the feature that the cable lead-out section crosses a ridge-side edge portion of the tile main body and communicates with the terminal-box-receiving recess. In this case, it is preferable that the cable lead-out section is formed of an opening groove in an upper surface of the ridge-side edge portion of the tile main body.

In the invention, the cable lead-out section and hence the connection of the terminal box and the cables can be located at a high level. Accordingly, the number of occasions in which the connection is exposed to the rainwater that has entered the terminal-box-receiving recess can be minimized. If the cable lead-out section is formed of a groove, the cables can be easily inserted through the cable lead-out section.

Furthermore, a power-generating roof tile according to the invention includes a photovoltaic module having a reverse surface thereof provided with a terminal box, and a tile main body including a recess that receives the photovoltaic module, and a terminal-box recess that is provided at a bottom of the recess and receives the terminal box. The tile main body further includes a cable lead-out section located at a ridge-side side wall of the terminal-box-receiving recess where the tile main body is mounted on an inclined roof. Output lead-out cables connected to the terminal box are led from the cable lead-out section to the ridge side.

In the invention, positive-side and negative-side output lead-out cables, which are independent of each other so as not to be used as a double-core cable, can be used as the output lead-out cables. Alternatively, a single double-core cable can be used, which is formed by combining positive-side and negative-side output lead-out cables as single-core cables.

In the invention, the output lead-out cables connected to the terminal box are led to the ridge side from a ridge-side side wall of the terminal-box-receiving recess of the tile main body. By virtue of this structure, even if, for example, rainwater enters the terminal-box-receiving recess that receives the terminal box, the number of occasions is small, in which the rainwater reaches a connection of the terminal box and the cables. Accordingly, corrosion or electrical short-circuiting at the connection can be avoided. Moreover, since the cables are led to the ridge side, it is not necessary to sharply bend the lead cables along the sarking about the cable lead-out section. This prevents the output lead-out cables from being damaged by the edge of the cable lead-out section. As a result, the invention can provide a high quality power-generating roof tile.

The invention includes the feature that the cable lead-out section is a hole extending through the side wall. The cable lead-out section of the invention does not reduce the strength of the ridge-side edge of the tile main body.

The invention also includes the feature that the output lead-out cables are led from the ridge-side side surface of the terminal box. Accordingly, the output lead-out cables can be led to the ridge side without bypassing them around the terminal box.

The invention further includes the feature that the terminal-box-receiving recess is provided at a width-directional central portion of the tile main body, and the cable lead-out section communicates with a width-directional central portion of a ridge-side side wall of the receiving recess. Accordingly, the positive-side and negative-side output lead-out cables can be made to the same length.

The invention includes the feature that a drain section is provided in an eaves-side portion of the tile main body so that it communicates with the recess and crosses the eaves-side edge portion. The drain section is formed of, for example, an opening groove in the upper surface of the eaves-side edge of the tile main body, or a hole extending through the eaves-side edge.

It is sufficient if one or more drain sections are provided. The drain section can have any size. The drain section may be provided obliquely.

In the invention, even if rainwater enters the recess in the tile main body that is mounted on an inclined roof, it can be discharged to the outside of the recess through the drain sections formed in the eaves-side edge of the tile main body. This drainage structure enables the amount of rainwater entering the terminal-box-receiving recess to be reduced, thereby keeping the water level in the receiving recess low. Thus, the structure is effective in preventing corrosion or electrical short-circuiting at the connection of the terminal box and the cables.

In addition, a power-generating roof tile according to the invention includes a photovoltaic module having a reverse surface thereof provided with a terminal box, and a tile main body including a recess that receives the photovoltaic module, and a terminal-box recess that is provided at a bottom of the recess and receives the terminal box. The tile main body further includes a thin wall section located in a ridge-side side wall of the terminal-box-receiving recess where the tile main body is mounted on an inclined roof. The thin wall section can be removed forming a cable lead-out section. Output lead-out cables connected to the terminal box are led from the cable lead-out section to the ridge side.

Furthermore, a power-generating roof tile according to the invention includes a photovoltaic module and a tile main body. The photovoltaic module has a reverse surface thereof provided with a terminal box, the box is connected to positive-side and negative-side output lead-out cables. The tile main body is mounted on an inclined roof, and includes a recess that receives the photovoltaic module, a terminal-box-receiving recess that is provided at a bottom of the recess and receives the terminal box, and a cable lead-out section arranged in a side wall on a roof ridge side of the terminal-box-receiving recess in such a manner as to be directed toward the ridge, for leading the two output lead-out cables toward the ridge.

BRIEF DESCRIPTION OF THE SEVERAL
VIEWS OF THE DRAWING

DETAILED DESCRIPTION OF THE INVENTION

The embodiments of the invention will be described with reference to the accompanying drawings.

Figure 1:
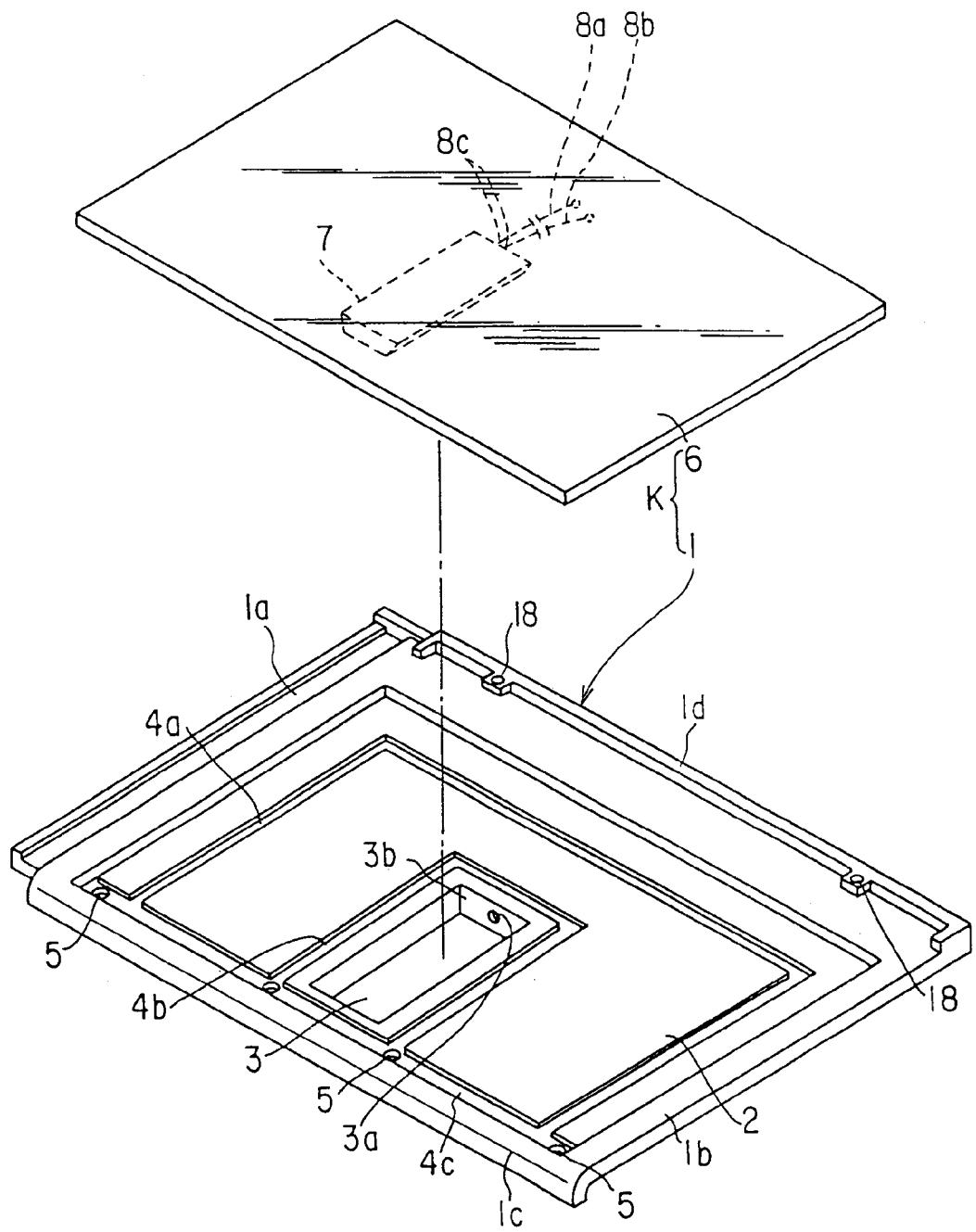
FIG. 1 is an exploded perspective view illustrating the configuration of a power-generating roof tile according to the invention.
Figure 2:
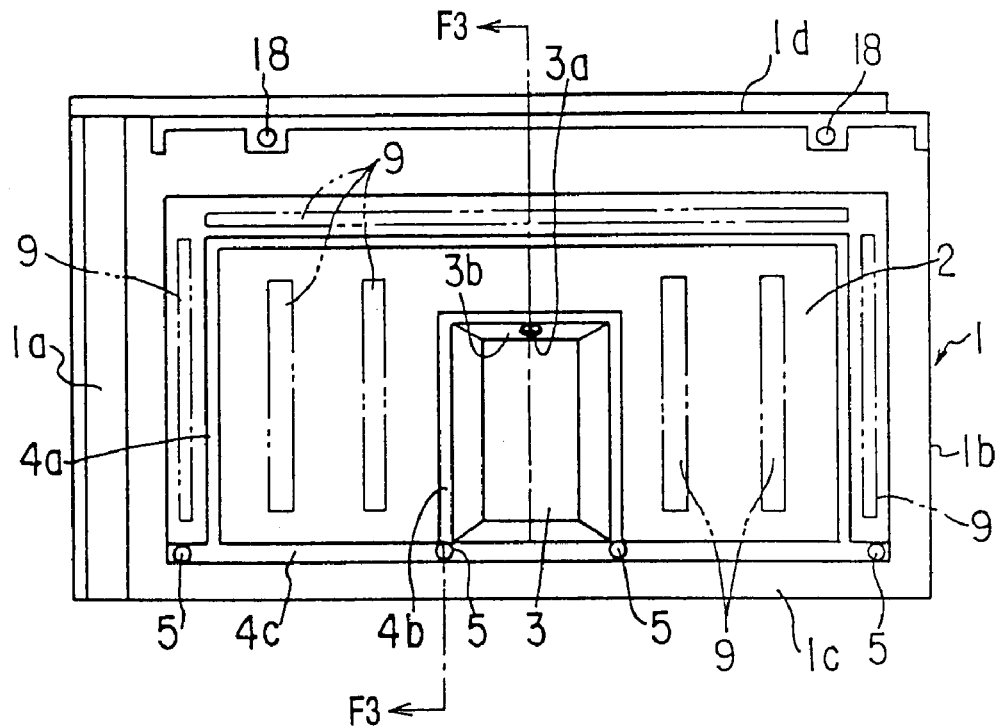
FIG. 2 is a plan view illustrating the main body of the power-generating roof tile of FIG. 1.
Figure 3:
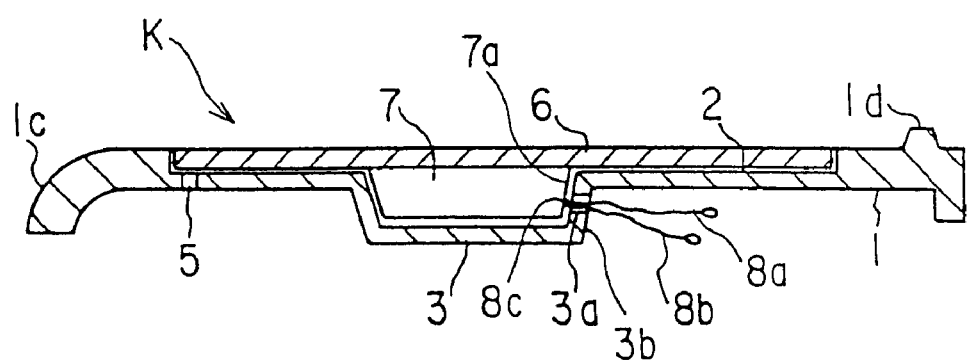
FIG. 3 is a sectional view taken along line F3—F3 in FIG. 2, illustrating the power-generating roof tile.
Figure 4:
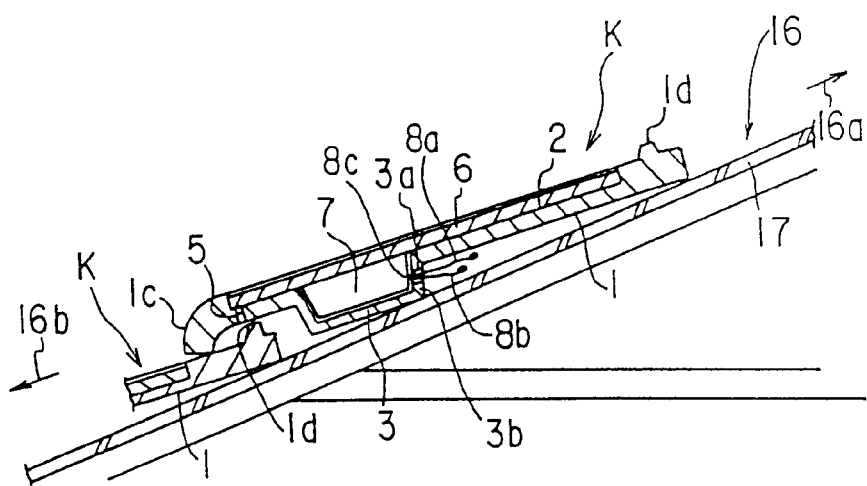
FIG. 4 is a sectional view illustrating a part of a roof covered with the power-generating roof tile of FIG. 1.
Figure 5:
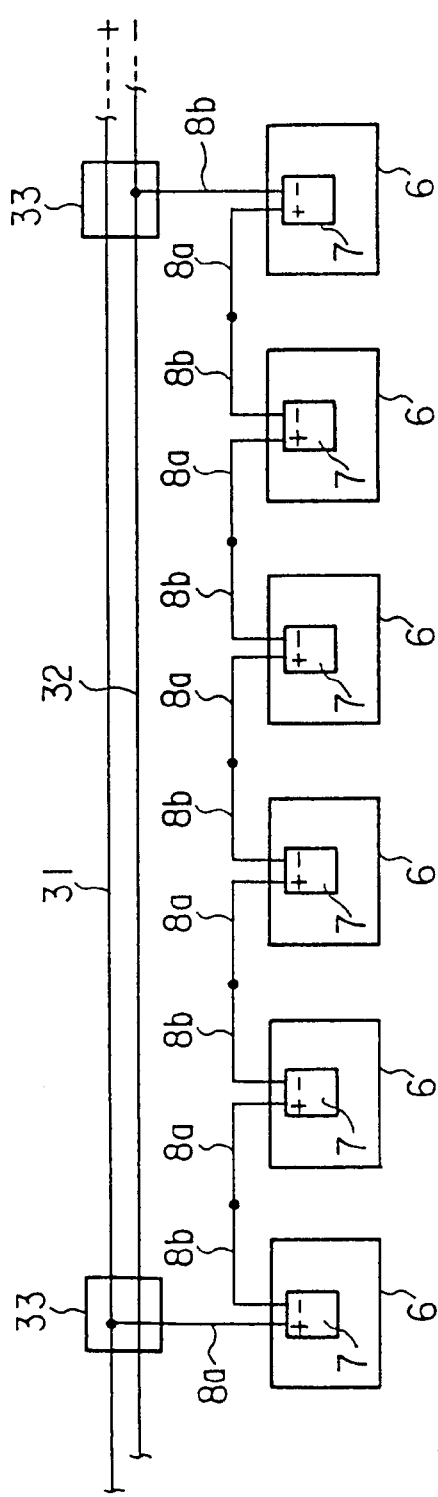
FIG. 5 is a wiring view illustrating electrical connections between photovoltaic modules included in a plurality of power-generating roof tiles according to the invention.
Figure 6:
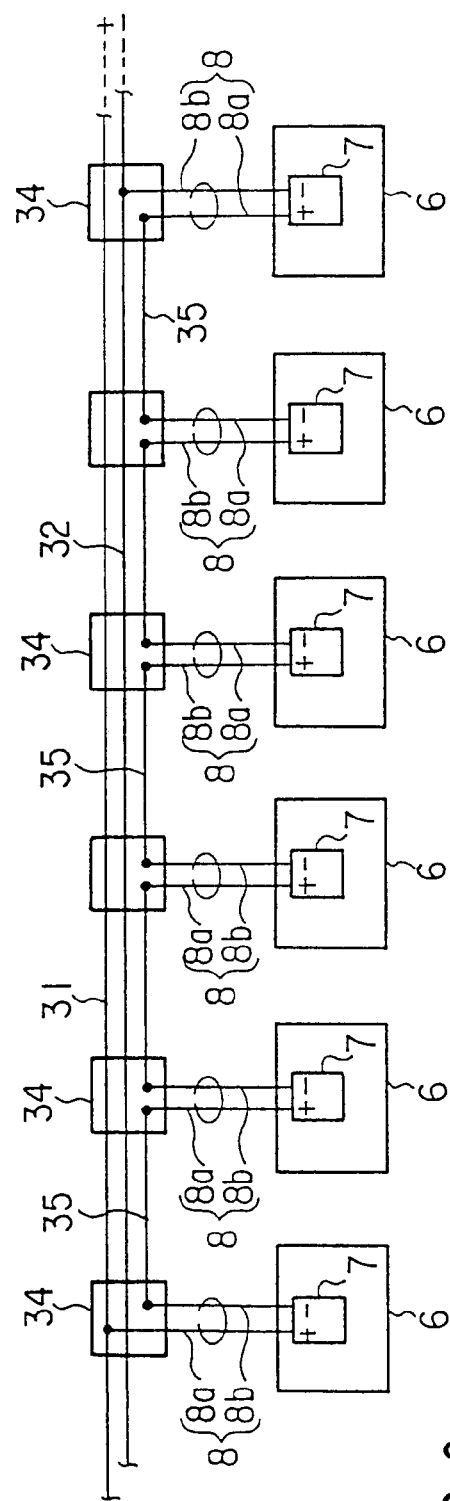
FIG. 6 is a wiring view illustrating comparative electrical connections between photovoltaic modules included in a plurality of power-generating roof tiles.

FIG. 1 is an exploded perspective view illustrating a power-generating roof tile according to the invention. FIG. 2 is a plan view of the main body of the roof tile. FIG. 3 is a sectional view taken along line F3—F3 in FIG. 2, illustrating the power-generating roof tile. FIG. 4 is a sectional view illustrating a part of a roof covered with the power-generating roof tile. FIG. 5 is a wiring view illustrating electrical connections between photovoltaic modules included in a plurality of power-generating roof tiles. FIG. 6 is a view illustrating comparative electrical connections between photovoltaic modules included in a plurality of power-generating roof tiles.

A power-generating roof tile K is used as a roof member for an inclined roof. As shown in FIG. 1, the power-generating roof tile K comprises a tile main body 1 and a photovoltaic module 6 capable of photovoltaic generation.

As shown in FIGS. 1 and 2, the tile main body 1 is formed of, for example, cement in the shape of a substantially rectangular flat plate. Overlap sections 1a and 1b are provided at the both side sections of the tile main body 1 such that the main bodies 1 of power-generating roof tiles of the same type arranged adjacent to each other from side to side will be engaged with each other in a male/female relationship. A front hanging section 1c is formed as the lower edge of the tile main body 1. A rear standing section 1d is formed as the upper edge of the tile main body 1.

As shown in FIG. 4, the front hanging section 1c is superposed upon the upper surface of a ridge-side edge portion of the tile main body 1 of another power-generating roof tile K (not shown) of the same type adjacent to the section 1c on the eaves side of the roof. The rear standing section id is placed on the lower surface of an eaves-side edge portion of another power-generating roof tile K (not shown) of the same type adjacent to the section 1d on the eaves side of the roof.

A rectangular recess 2 is provided over substantially the entire surface of the tile main body 1 except for a peripheral frame portion of the body. The recess 2 is formed slightly deeper than the thickness of a photovoltaic module 6 described later. A rectangular terminal-box-receiving recess 3 is formed in substantially a width-directional (side-to-side directional) central portion of the recess 2.

The receiving recess 3 extends vertically (from the ridge to the eaves) in the tile main body 1. The terminal-box-receiving recess 3 has an ridge-side side wall 3b located closer to the ridge side than the half point of the ridge-eaves direction of the terminal-box-receiving recess 3. The reverse surface of the terminal-box-receiving recess 3 is at substantially the same level as the front hanging section 1c of the title main body 1. Thereby, the tile main body 1 can be mounted stably on a roof.

A first drainage groove 4a is formed in a peripheral portion of the bottom of the recess 2. The drainage groove 4a continuously extends along an upper portion and both side portions of the recess 2. A second drainage groove 4b is formed in a central portion of the bottom of the recess 2. A third drainage groove 4c is provided in the lower edge portion of the recess 2 along its entire length. The lower ends of the first and second drainages grooves 4a and 4b communicate with the third drainage groove 4c. This being so, water flowing through the first and second drainages grooves 4a and 4b collects into the third drainage groove 4c.

Drain holes 5 are formed in the both opposite ends of the third drainage groove 4c and confluent sections between the second and third drainages grooves 4c and 4b, i.e. in four sections in total. The drain holes 5 extend to the reverse surface of the tile main body 1.

A cable lead-out section 3a is formed in the side wall 3b of the terminal-box-receiving recess 3, which is located on the upper-side of the tile main body 1. The cable lead-out section 3a comprises a hole that extends through the side wall 3b. The side wall 3b is located on the ridge side where the tile main body 1 is mounted on inclined sarking 17 (see FIG. 4) on the roof.

The recess 2 of the tile main body 1, constructed as above, has a size suitable for the size of the photovoltaic module 6. The recess 2 contains the photovoltaic module 6. The photovoltaic module 6 is adhered to the recess 2 of the tile main body 1 by means of, for example, an adhesive 9 indicated by the two-dot line in FIG. 2. The entire surface of the photovoltaic module 6 may be coated with the adhesive 9. Alternatively, a plurality of portions independent of each other may be coated with the adhesive 9 as shown in FIG. 2. In particular, in the latter adhesion case, even if part of the adhesive 9 cracks, this crack 9 will not influence the other portions of the adhesive which are separate from the crack. This means that the latter adhesion manner is highly reliable in attaching the photovoltaic module 6 to the recess 2.

The photovoltaic module 6 has a rectangular, thin panel configuration. The thin panel is of a configuration in which, for example, a transparent electrode layer, an amorphous semiconductor layer and a reverse-side electrode layer, etc.

are provided in this order on the reverse surface of a single transparent glass substrate. Further, the reverse surface is further coated with a sealing material layer.

As shown in FIGS. 3 and 4, a terminal box 7 is fixed to the reverse surface of the photovoltaic module 6. The box 7 is located on a substantially central portion of the photovoltaic module 6 in the longitudinal direction. Two output lead-out cables 8a and 8b are connected to a side surface 7a of the terminal box 7 close to the ridge. 8c indicates a connection between the terminal box 7 and the cables 8a and 8b.

One 8a of the output lead-out cables is for a positive electrode, and the other output lead-out cable 8b is for a negative electrode. Each of the two cables 8a and 8b is a single-core cable that comprises an electric wire coated with an insulator. The two cables 8a and 8b are independent of each other so that they can be handled without being limited by each other in wiring. The cables 8a and 8b have their respective connectors at their tips.

As shown in FIG. 3, the terminal box 7 is received in the terminal-box-receiving recess 3 of the tile main body 1. In this received state, the output lead-out cables 8a and 8b are led to the ridge side of the reverse surface of the tile main body 1. This leading is executed through the cable lead-out section 3a formed in the ridge-side side wall 3b of the terminal-box-receiving recess 3. This prevents the output lead-out cables 8a and 8b from being sharply bent along the sarking 17.

A description will now be given of roofing a building with a power-generating roof tile K constructed as above (so-called roofing). As seen from FIG. 4, sarking 17 that inclines downwardly from a ridge side 16a to an eaves side 16b is provided on a roof 16. Power-generating roof tiles K are mounted onto the sarking 17 directly or with a tile underlayer interposed therebetween.

In a manner similar to usual roofing, the power-generating roof tiles K are sequentially mounted onto the sarking 17 from the ridge side 16a to the eaves side 16b. In this case, the tile main bodies 1 adjacent from side to side are connected to each other by engaging their overlap sections 1a and 1b with each other in a male/female relationship. Fixing nails to be hammered into the sarking 17 are inserted through attachment holes 18 (see FIGS. 1 and 2) formed in an upper end portion of each tile main body 1. Further, the photovoltaic modules, which are adjacent to each other in a direction from the ridge to the eaves, are connected to each other by making an upper portion of the rear standing section id of each tile main body 1 located on the eaves side overlap with the front hanging section 1c of another tile main body 1 adjacent to the first-mentioned main body and located on the ridge side. In this overlap state, the drain holes 5 of the ridge-side tile main body 1 are positioned below (the eaves side 16b) the rear standing section id of the eaves-side tile main body 1 adjacent thereto. The ridge-side tile main body 1 is also fixed to the sarking 17 by inserting, for example, tile-fixing nails into the attachment holes 18.

By repeating the above-described roofing work, a large number of tiles K with photovoltaic modules are mounted on the sarking 17. This provides a major part of the roof 16. In parallel with the roofing work, an operation of electrically connecting adjacent ones of the photovoltaic modules 6 in parallel or in series is performed. This connection work is executed, using the output lead-out cables 8a and 8b led to the ridge side from the cable lead-out section 3a of the terminal-box-receiving recess 3.

A wiring example shown in FIG. 5 will be described. In the figure, reference numeral 31 denotes a plus-side trunk line to be connected to an indoor-side inverter, reference numeral 32 a minus-side trunk line, and reference numeral 33 a pair of two-line-adaptable bushings. In the case of FIG. 5, six photovoltaic modules 6 are connected in series so that the modules 6 will serve as one output unit.

To this end, the tip connector of the positive-side output-lead-out line 8a of each photovoltaic module 6 is connected, in a male/female manner, to that of the negative-side output-lead-out line 8b of another photovoltaic module 6 adjacent to said each module, thereby connecting the six photovoltaic modules 6 in series. The positive-side output-lead-out cable 8a of the photovoltaic module 6 located at one end of the thus-connected output unit is connected to the plus-side trunk line 31 via one of the bushings 33. Similarly, the negative-side output-lead-out cable 8b of the photovoltaic module 6 located at the other end of the output unit is connected to the minus-side trunk line 32 via the other bushing 33.

FIG. 6 shows a comparative example of wiring of six photovoltaic modules 6. In the comparative example, in place of a single-core configuration, a double-core cable 8 formed by combining two cables is used as the output lead-out cables 8a and 8b of each photovoltaic module 6. In FIG. 6, reference numeral 34 denotes three-line-adaptable bushings.

In the single double-core cable 8, each of the plus/minus output lead-out cables 8a and 8b cannot be independently used for wiring work. Accordingly, the electrical connection of the positive and negative electrodes of adjacent photovoltaic modules 6 is executed, using the three-line-adaptable bushings 34 each provided for a corresponding photovoltaic module 6. In FIG. 6, reference numeral 35 denotes electrical wires that connect adjacent bushings 34 in series.

Thus, in the output unit, six photovoltaic modules are connected in series. This connection is performed using the bushings 34 each provided for a corresponding photovoltaic module 6, and the electrical wires 35 connecting the bushings 34. The positive-side output-lead-out cable 8a of the photovoltaic module 6 located at one end of the thus-connected output unit is connected to the plus-side trunk line 31. This connection is performed via the bushing 34 that is provided for the photovoltaic module 6 located at the one end. Similarly, the negative-side output-lead-out cable 8b of the photovoltaic module 6 located at the other end of the output unit is connected to the minus-side trunk line 32. This connection is performed via the bushing 34 that is provided for the photovoltaic module 6 located at the other end.

In the case of FIG. 5, wiring is made using the two single-core cables as the plus and minus output lead-out cables 8a and 8b. Therefore, it is not necessary to use the electrical wire 35, shown in FIG. 6, in a section in which the trunk lines 31 and 32 are arranged. Further, an insulation sheath used to create a double-core cable is not necessary. Furthermore, it is sufficient to use only one pair of bushings 33 for the output unit, unlike the case of FIG. 6 where the same number of bushings 34 as the photovoltaic modules 6 are needed. This means that the roof 16 covered with the power-generating roof tiles K requires a small number of components for wiring, and hence has a simple wiring configuration. Moreover, the bushings 33 are used in place of the three-line-adaptable bushings 34 of a complicated structure shown in FIG. 6. Since thus, two-line-adaptable bushings of a simple structure and low cost can be used, the cost of the roof 16 can be reduced.

In the power-generating roof tiles K with which the roof 16 is covered, it is possible that rainwater entering a clearance between the recess 2 of the tile main body 1 and the photovoltaic module 6 will flow into the terminal-box-receiving recess 3. In this case, the rainwater having entered the terminal-box-receiving recess 3 is stored therein.

However, the power-generating roof tiles K are mounted on the roof 16 that inclines in the direction from the ridge to the eaves. Accordingly, the side wall 3b of the terminal-box-receiving recess 3, in which the cable lead-out section 3a is formed, is located high on the ridge side. This means that rainwater having collected in the terminal-box-receiving recess 3 does not reach the connection 8c of the terminal box 7 and the output lead-out cables 8a and 8b, thereby preventing the connection 8c from being exposed to the rainwater having collected in the terminal-box-receiving recess 3. This being so, the connection 8c is at low risk of corrosion or electrical short-circuiting.

As described above, the two output lead-out cables 8a and 8b are led to the ridge side through the ridge-side cable lead-out section 3a. This enables, when creating the wiring structure shown in FIG. 5, the output lead-out cables 8a and 8b thus led to be prevented from being sharply bent about the cable lead-out section 3a along the sarking 17.

Consequently, it is possible that the output lead-out cables 8a and 8b will not be strongly pressed against the edge of the cable lead-out section 3a. In other words, the insulation coating of the output lead-out cables 8a and 8b can be prevented from being significantly damaged by the edge of the cable lead-out section 3a. This cable protection is also effective in a case where the tile main body 1 is made of cement and a burr occurs at the edge of the cable lead-out section 3a.

For the same reason as above, in packaging the power-generating roof tile K, it is not necessary to sharply bend the output lead-out cables 8a and 8b about the cable lead-out section 3a. Accordingly, irrespective of vibration that occurs during the transport of the tile to a roofing work site, the output lead-out cables 8a and 8b are at low risk of being damaged by the edge of the cable lead-out section 3a.

Figure 7:
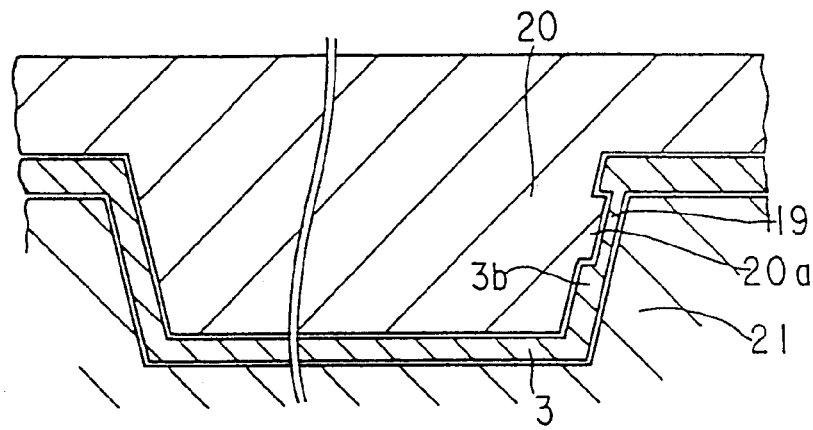
FIG. 7 is a sectional view illustrating a manufacturing state of another power-generating roof tile according to the invention.
Figure 8:
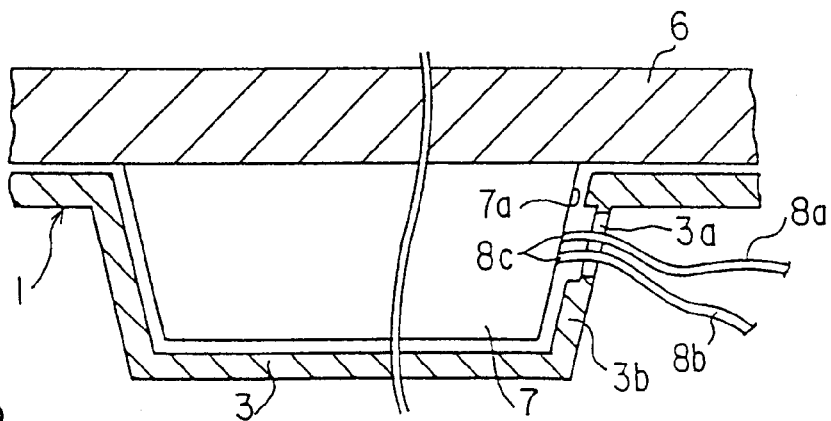
FIG. 8 is a sectional view illustrating a part of said another power-generating roof tile.

Referring now to FIGS. 7 and 8, a description will be given of another embodiment of the invention. In this embodiment, reference numerals corresponding to those in the embodiment described above with reference to FIGS. 1–5 denote similar elements, and no detailed description is given thereof. This embodiment differs from the above-described one in means for providing the cable lead-out section 3a in the side wall 3b of the terminal-box-receiving recess 3 of the tile main body 1, as is shown in FIGS. 7 and 8.

As seen from FIG. 7, a thin wall section 19 is provided at a side wall of the terminal-box-receiving recess 3 and at an upper end side of the tile main body 1. In other words, the thin wall section 19 is provided at the side wall 3b that is located close to the ridge when the tile main body 1 is mounted on the sarking of a roof. In FIG. 7, reference numeral 20 indicates a male mold, and reference numeral 21 a female mold. These are used to mold the terminal-box-receiving recess 3 of the tile main body 1. A projecting section 20a is provided at a part of the male mold 20. When both the molds 20 and 21 are engaged with each other, a narrow space corresponding to the thin wall section 19 is defined between the projecting section 20a and the female mold 21. To obtain the thin wall section 19, it is sufficient if the terminal-box-receiving recess 3 of the tile main body 1 is molded using both the molds 20 and 21.

After the tile main body 1 of cement is molded using the molds 20 and 21, the thin wall section 19 is struck with, for example, a hammer. As a result of punching out the thin wall section 19, the cable lead-out section 3a is formed as shown in FIG. 8. The two output lead-out cables 8a and 8b can be led to the ridge side through the thus-constructed cable lead-out section 3a. Therefore, the output lead-out cables 8a and 8b led therethrough are not sharply bent. The structures other than the above-described one, which include structures that are not shown in FIGS. 7 and 8, are similar to those employed in the embodiment described referring to FIGS. 1–5.

Figure 9:
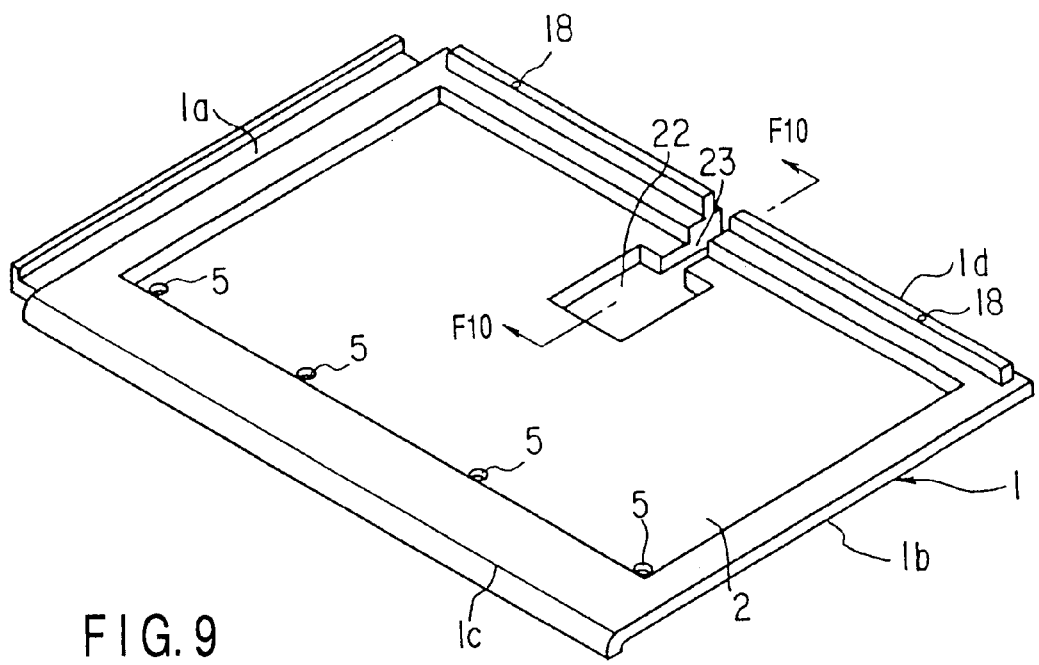
FIG. 9 is a perspective view illustrating the main body of yet another power-generating roof tile according to the invention.
Figure 10:
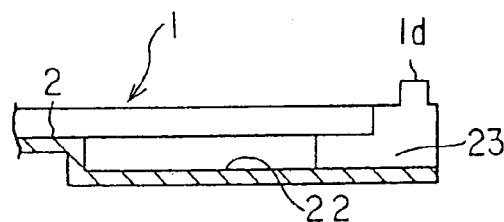
FIG. 10 is a sectional view taken along line F10—F10 in FIG. 8, illustrating the main body of the power-generating roof tile.
Figure 11:
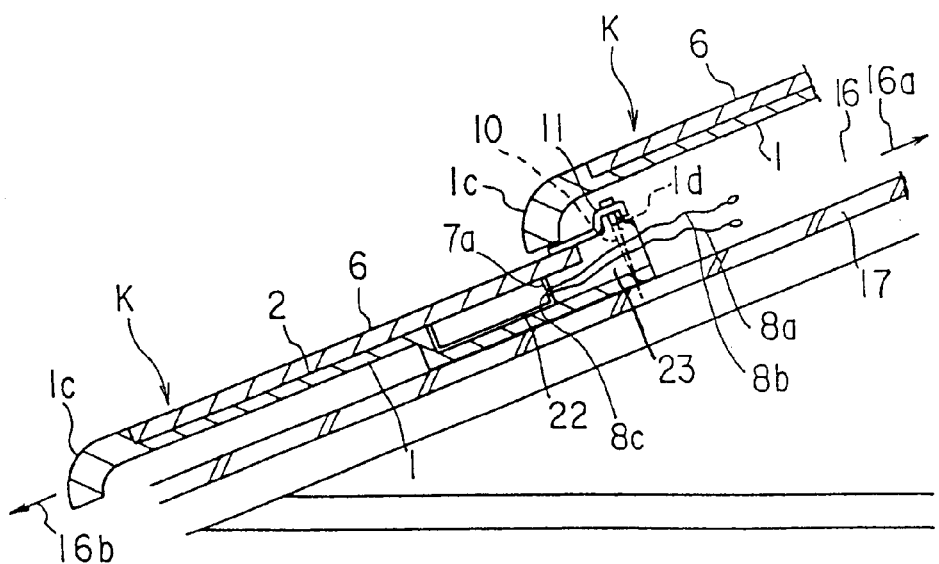
FIG. 11 is a sectional view illustrating a part of a roof covered with yet another power-generating roof tile according to the invention.

Referring then to FIGS. 9–11, yet another embodiment will be described. In this yet another embodiment, reference numerals corresponding to those in the embodiment described above with reference to FIGS. 1–5 denote similar elements, and no detailed description is given thereof. This embodiment differs from the above-described ones in, for example, the arrangement of a terminal-box-receiving recess 22 and a cable lead-out section 23.

In the yet another embodiment, the terminal-box-receiving recess 22 for receiving the terminal box 7 is provided at an upper edge portion of the recess 2 that is used to contain the photovoltaic module 6. In other words, as shown in FIG. 9, the terminal-box-receiving recess 22 is provided at a ridge-side portion (ridge-side edge portion) of the tile main body 1 where the tile main body 1 is mounted on the roof.

The cable lead-out section 23 is formed of a groove, which crosses the rear standing section 1d of the tile main body 1 as shown in FIG. 9. The cable lead-out section 23 communicates with the terminal-box-receiving recess 22. As shown in FIG. 10, the bottoms of the terminal-box-receiving recess 22 and the cable lead-out section 23 are continuous and level with each other, without any step. In FIG. 11, reference numeral 10 indicates a nail inserted through the attachment hole 18, and reference numeral 12 a nail fitting that covers the rear standing section 1d. The structures other than the above-described one, which include structures that are not shown in FIGS. 9–11, are similar to those employed in the embodiment described referring to FIGS. 1–5.

In the tile main body 1 constructed as above, as shown in FIG. 11, the photovoltaic module 6 is received in the recess 2 of the tile main body 1, and the terminal box 7 is received in the terminal-box-receiving recess 22. In this state, the two output lead-out cables 8a and 8b connected to the ridge-side side surface 7a of the terminal box 7 can be led to the ridge side through the cable lead-out section 23. At this time, the output lead-out cables 8a and 8b can be led along the cable lead-out section 23 toward the upper end of the tile main body 1, i.e. to the ridge side, without sharply bending the cables.

Therefore, also in this yet another embodiment, corrosion or electrical short-circuiting at the connection 8c can be prevented. Specifically, it is possible that rainwater will enter a clearance between the recess 2 of the tile main body 1 and the photovoltaic module 6, and flow into and collect in the terminal-box-receiving recess 22. In this case, since the cable lead-out section 23 is at a higher level than the terminal-box-receiving recess 22, the connection 8c of the terminal box 7 and the output lead-out cables 8a and 8b can be prevented from being exposed to the rainwater having collected in the terminal-box-receiving recess 22.

Moreover, in the yet another embodiment, the cable lead-out section 23 is upwardly open. Thereby, when containing the photovoltaic module 6 in the recess 2, the two output lead-out cables 8a and 8b can be received into the cable lead-out section 23 from above. Accordingly, the troublesome work of inserting the output lead-out cables 8a and 8b into the hole is not necessary, which means that the embodiment reduces the workload involved.

Figure 12:
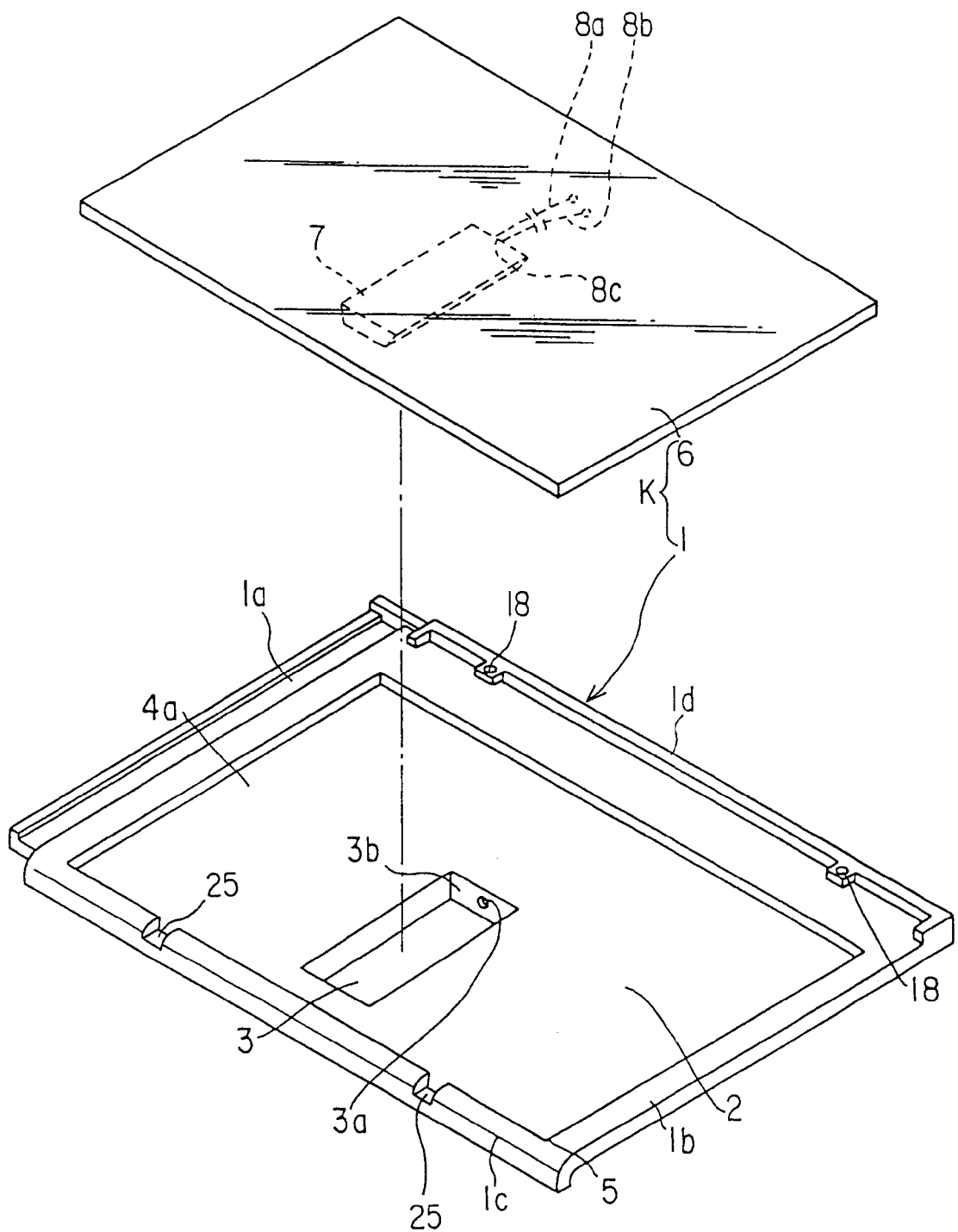
FIG. 12 is an exploded perspective view of a further power-generating roof tile according to the invention.
Figure 13:
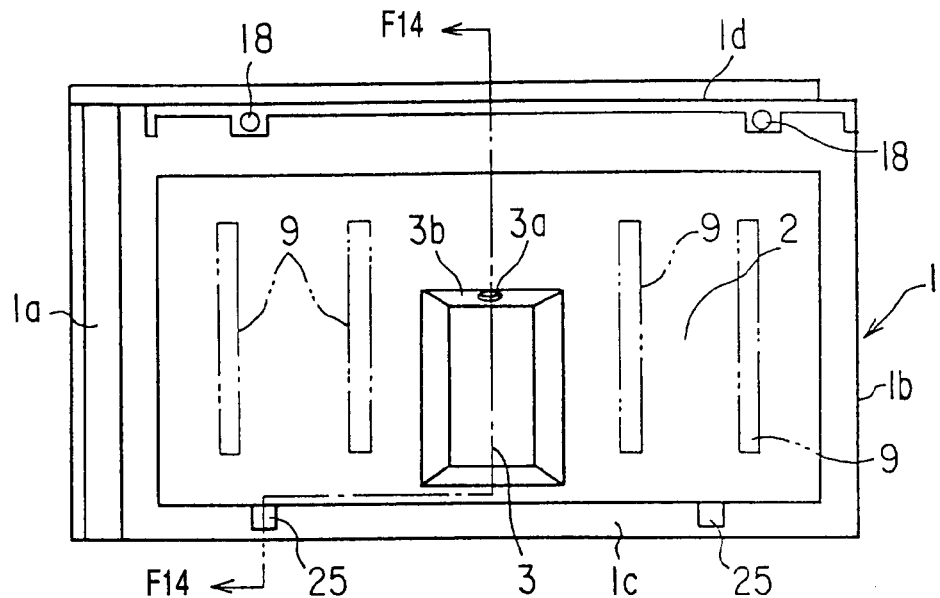
FIG. 13 is a plan view illustrating the main body of the power-generating roof tile shown in FIG. 12.
Figure 14:
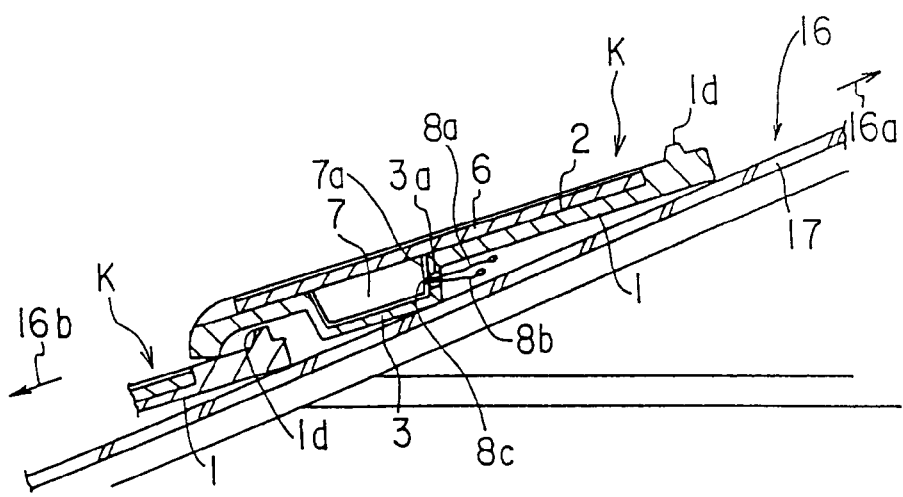
FIG. 14 is a sectional view taken along line F14—F14 in FIG. 13, illustrating a part of a roof covered with the main body of the power-generating roof tile of FIG. 12.

Referring further to FIGS. 12–14, another embodiment of the invention will be described. In this embodiment, reference numerals corresponding to those in the embodiment described above with reference to FIGS. 1–5 denote similar elements, and no detailed description is given thereof. This embodiment differs from the above-described ones in drain means for discharging water from the recess 2 to the outside.

The bottom surface of the recess 2 is a flat surface without any projection or depression, except for the terminal-box-receiving recess 3. At least one drain section 25, e.g. two drain sections, is provided in a lower edge portion of the tile main body 1. These drain sections 25 cross the front hanging section 1c. The front hanging section 1c provides an eaves-side edge portion located at the eaves side, where the tile main body 1 is mounted on the inclined sarking 17. Both the drain sections 25 are formed of opening grooves in the surface of the front hanging section 1c.

The bottoms surface of the drain sections 25 are continuous with and level with the bottom surface of the tile main body 1. However, the invention is not limited to this structure. The bottoms of the drain sections 25 may be lower by one step than that of the tile main body 1. Alternatively, the bottoms surface of the drain sections 25 may obliquely and downwardly incline from the bottom surface of the tile main body 1. Yet alternatively, both the drain sections 25 may be downwardly bent so that they reach the lower end of the front hanging section 1c. The structures other than the above-described one, which include structures that are not shown in FIGS. 12–14, are similar to those employed in the embodiment described referring to FIGS. 1–5.

Also in the power-generating roof tile K of this embodiment, it is possible that rainwater, entering a clearance between the recess 2 of the tile main body 1 mounted on the inclined roof and the photovoltaic module 6, will flow into and collect in the terminal-box-receiving recess 3. However, the cable lead-out section 3a of the terminal-box-receiving recess 3 is provided in the side wall 3b of the terminal-box-receiving recess 3, which is located at a high level on the ridge side. Accordingly, the number of occasions is minimized, in which the connection 8c of the terminal box 7 and the output lead-out cables 8a and 8b is exposed to the rainwater that has collected in the terminal-box-receiving recess 3.

Moreover, the rainwater entering the recess 2 of the tile main body 1 can be smoothly discharged to the outside of the recess 2 through the drain sections 25 formed in the front falling 1c of the tile main body 1. This drainage structure enables the amount of rainwater entering the terminal-box-receiving recess 3 to be reduced, thereby keeping the water level in the receiving recess 3 low.

Consequently, corrosion or electrical short-circuiting at the connection 8c can be effectively prevented.

In addition, also in the yet another embodiment, the two output lead-out cables 8a and 8b are led to the ridge side through the ridge-side cable lead-out section 3a. Therefore, it is not necessary to sharply bend the output lead-out cables 8a and 8b, led therethrough, along the sarking 17 about the cable lead-out section 3a. This being so, the possibility of the insulation coating of the cables 8a and 8b being damaged is slim.

As described above, the present invention is useful in the field of power-generating roof tiles used to convert solar energy into electrical energy, the field of manufacturing the tiles, and the technical field of building roofs that use the power-generating roof tiles as roof members.

What is claimed is:

1. A power-generating roof tile which is used as a roofing member for a building and performs solar-light power generation, comprising:

a photovoltaic module having a reverse surface thereof provided with a terminal box, the box being connected to positive-side and negative-side output lead-out cables, each of the cables being a single-core cable; and a tile main body mounted on an inclined roof, and including a recess that receives the photovoltaic module, a terminal-box-receiving recess that is provided at a bottom of the recess and receives the terminal box, and a cable lead-out section that is provided at a portion toward a ridge of the roof, for leading the two output lead-out cables toward the ridge.

2. The power-generating roof tile according to claim 1, wherein the cable lead-out section crosses a ridge-side edge portion of the tile main body and communicates with the terminal-box-receiving recess.

3. The power-generating roof tile according to claim 1, wherein the cable lead-out section is formed of an opening groove in an upper surface of a ridge-side edge portion of the tile main body.

4. A power-generating roof tile which is used as a roofing member for a building and performs solar-light power generation, comprising:

a photovoltaic module having a reverse surface thereof provided with a terminal box, the box being connected to positive-side and negative-side output lead-out cables; and a tile main body mounted on an inclined roof, and including a recess that receives the photovoltaic module, a terminal-box-receiving recess that is provided at a bottom of the recess and receives the terminal box, and a cable lead-out section that is provided at a side wall of the receiving recess toward a ridge of the roof, for leading the two output lead-out cables toward the ridge.

5. The power-generating roof tile according to claim 4, wherein the cable lead-out section is a hole extending through the side wall.

6. The power-generating roof tile according to claim 1, wherein the output lead-out cables are led from a ridge-side side surface of the terminal box.

7. The power-generating roof tile according to claim 1, wherein the terminal-box-receiving recess is provided at a width-directional central portion of the tile main body, and the cable lead-out section communicates with a width-directional central portion of a ridge-side side wall of the terminal-box-receiving recess.

8. The power-generating roof tile according to claim 1, further comprising a drain section provided in an eaves-side edge portion of the tile main body, the drain section communicating with the recess that receives the photovoltaic module and crossing the eaves-side edge portion.

9. The power-generating roof tile according to claim 4, wherein the output lead-out cables are led from a ridge-side side surface of the terminal box.

10. The power-generating roof tile according to claim 4, wherein the terminal-box-receiving recess is provided at a width-directional central portion of the tile main body, and the cable lead-out section communicates with a width-directional central portion of a ridge-side side wall of the terminal-box-receiving recess.

11. The power-generating roof tile according to claim 4, further comprising a drain section provided in an eaves-side edge portion of the tile main body, the drain section communicating with the recess that receives the photovoltaic module and crossing the eaves-side edge portion.

12. The power-generating roof tile according to claim 1, wherein the cable lead-out section is a hole extending through the tile main body.

13. The power-generating roof tile according to claim 4, wherein the cable lead-out section crosses a ridge-side edge portion of the tile main body and communicates with the terminal-box-receiving recess.

14. The power-generating roof tile according to claim 4, wherein the cable lead-out section is formed of an opening groove in an upper surface of a ridge-side edge portion of the side-wall.

15. A power-generating roof tile which is used as a roofing member for a building and performs solar-light power generation, comprising:
- a photovoltaic module having a reverse surface thereof provided with a terminal box, the box being connected to positive-side and negative-side output lead-out cables; and
- a tile main body mounted on an inclined roof, and including a recess that receives the photovoltaic module, a terminal-box-receiving recess that is provided at a bottom of the recess and receives the terminal box, and a thin wall section provided in a side wall of the receiving recess toward a ridge of the roof, wherein the thin wall section can be removed forming a cable lead-out section for leading the two output lead-out cables toward the ridge.

16. The power-generating roof tile according to claim 15, wherein the cable lead-out section is a hole extending through the side wall.

17. The power-generating roof tile according to claim 15, wherein the output lead-out cables are led from a ridge-side surface of the terminal box.

18. The power-generating roof tile according to claim 15, wherein the terminal-box-receiving recess is provided at a width-directional central portion of the tile main body, and the cable lead-out section communicates with a width-directional central portion of a ridge-side side wall of the terminal-box-receiving recess.

19. The power-generating roof tile according to claim 15, further comprising a drain section provided in an eaves-side edge portion of the tile main body, the drain section communicating with the recess that receives the photovoltaic module and being provided in a vicinity of an eaves-side edge portion of the recess.

20. A power-generating roof tile which is used as a roofing member for a building and performs solar-light power generation, comprising:
- a photovoltaic module having a reverse surface thereof provided with a terminal box, the box being connected to positive-side and negative-side output lead-out cables; and
- a tile main body mounted on an inclined roof, and including a recess that receives the photovoltaic module, a terminal-box-receiving recess that is provided at a bottom of the recess and receives the terminal box, and a cable lead-out section arranged in a side wall on a roof ridge side of the terminal-box-receiving recess in such a manner as to be directed toward the ridge, for leading the two output lead-out cables toward the ridge.

* * * * *